United States Patent [19]

Kuechler et al.

[11] Patent Number: 5,688,515

[45] Date of Patent: Nov. 18, 1997

[54] HYPOCHLORITE DONOR/BROMIDE ION DONOR TABLETS WHICH ARE STABLE IN WATER

[75] Inventors: Thomas C. Kuechler, St. Louis; Lawrence F. Rakestraw, Chesterfield, both of Mo.

[73] Assignee: Occidental Chemical Corporation, Niagara Falls, N.Y.

[21] Appl. No.: 362,738

[22] Filed: Dec. 21, 1994

Related U.S. Application Data

[63] Continuation of Ser. No. 750,577, Aug. 28, 1991, abandoned, which is a continuation-in-part of Ser. No. 750,744, Aug. 21, 1991, abandoned, which is a continuation of Ser. No. 366,936, Jun. 16, 1989, abandoned.

[51] Int. Cl.⁶ ..................................................... A01N 25/08
[52] U.S. Cl. ........................ 424/408; 424/405; 424/409; 424/661; 424/723
[58] Field of Search ..................... 424/405, 408, 424/409, 661, 723, 468; 514/241

[56] References Cited

U.S. PATENT DOCUMENTS

| | | | |
|---|---|---|---|
| 1,126,432 | 11/1915 | FRX . | |
| 1,196,870 | 7/1916 | GBX . | |
| 1,327,531 | 8/1920 | GBX . | |
| 1,358,617 | 7/1920 | GBX . | |
| 2,042,254 | 3/1936 | DEX . | |
| 2,815,311 | 12/1957 | Ellis | 167/18 |
| 3,035,056 | 5/1962 | Symes et al. | 260/248 |
| 3,035,057 | 5/1962 | Symes et al. | 260/248 |
| 3,147,219 | 9/1964 | Paterson | 210/62 |
| 3,150,132 | 9/1964 | Symes et al. | 260/248 |
| 3,152,073 | 10/1964 | Morton | 210/62 |
| 3,256,199 | 6/1966 | Symes et al. | 252/99 |
| 3,294,797 | 12/1966 | Shallenberger | 260/248 |
| 3,364,146 | 1/1968 | Casey et al. | 252/99 |
| 3,412,021 | 11/1968 | Paterson | 210/62 |
| 3,846,324 | 11/1974 | Lohmann et al. | 252/95 |
| 3,876,768 | 4/1975 | Blank | 424/128 |
| 3,931,213 | 1/1976 | Kaminski et al. | 26/307 |
| 3,975,271 | 8/1976 | Saunier et al. | 210/62 |
| 4,000,293 | 12/1976 | Kaminski et al. | 42/272 |
| 4,119,535 | 10/1978 | White et al. | 210/62 |
| 4,241,080 | 12/1980 | Burk | 424/304 |
| 4,297,224 | 10/1981 | Macchiarolo et al. | 210/755 |
| 4,300,897 | 11/1981 | Gray | 8/111 |
| 4,411,799 | 10/1983 | Ito et al. | 210/753 |
| 4,451,376 | 5/1984 | Sharp | 210/701 |
| 4,489,098 | 12/1984 | Relenyi et al. | 424/333 |

(List continued on next page.)

FOREIGN PATENT DOCUMENTS 90909954.1 6/1990 European Pat. Off. .
WO 89/12606 12/1989 WIPO .

OTHER PUBLICATIONS

Matson, et al., "Biofouling Control in Recycled Cooling Water with Bromo Chloro Dimethylhydantoin," Cooling Tower Institute, 1982 Annual Meeting (Feb. 1, 1982).

White, The Handbook of Chlorination, 2d ed., Van Nostrand Reinhold Co., N.Y.

Holzwarth, et al., "The Fate of Chlorine and Chloramines in Cooling Towers–Henry's Law Constants for Flashoff," Water Res., vol. 18, No. 11, pp. 1421–1427 (1984).

Shere, et al., "Effect of Bromide-Hypochlorite Bactericides on Microorganisms," Applied Microbiology, vol. 10, 538–541 (1962).

(List continued on next page.)

*Primary Examiner*—Neil S. Levy

[57] ABSTRACT

Disclosed is a water stable tablet for disinfecting recirculating water systems comprising chlorinated isocyanurate, sodium bromide and a stabilizer which regulates the rate at the chlorinated isocyanurate and the sodium bromide are dissolved or dispersed in flowing water. The stabilizer may be an active chlorine stabilizer compound that is compatible with chlorinated isocyanurates in the solid state, capable of binding active halogen (chlorine or bromine in the +1 valence state), and less soluble when fully chlorinated than in the less than chlorinated state.

15 Claims, 2 Drawing Sheets

○ ACL 90 GRANULES
⊛ NaBr GRANULES

U.S. PATENT DOCUMENTS

| | | | |
|---|---|---|---|
| 4,557,926 | 12/1985 | Nelson et al. | 424/19 |
| 4,661,344 | 4/1987 | Relenyi | 424/79 |
| 4,681,948 | 7/1987 | Worley | 548/319 |
| 4,698,165 | 10/1987 | Theyson | 210/755 |
| 4,755,354 | 7/1988 | Trinh et al. | 422/37 |
| 4,759,852 | 7/1988 | Trulear | 210/699 |
| 4,767,542 | 8/1988 | Worley | 21/755 |
| 4,846,979 | 7/1989 | Hamilton | 210/754 |
| 5,000,869 | 3/1991 | Dittert | 252/174.13 |
| 5,019,380 | 5/1991 | Heiler | 424/81 |
| 5,049,385 | 9/1991 | Wiedrich et al. | 424/408 |
| 5,268,002 | 12/1993 | Olson et al. | 8/107 |
| 5,338,461 | 8/1994 | Jones | 210/755 |
| 5,476,670 | 12/1995 | Hicht et al. | 424/661 |
| 5,498,415 | 3/1996 | Jones | 424/409 |

OTHER PUBLICATIONS

Petterson, et al., "N–Halogen Compounds. II. The N–Cl Stretching Band in Some N–Chloramides. The Structure of Trichloroisocyanuric Acid," The Journal of Organic Chemistry, vol. 25, No. 9, pp. 1595–1598 (1960).

Nelson, et al., "ACL Technology of Residential Spas and Hot Tubs," Monsanto Technology, report No. MSL 1233, (1980).

Nelson, "Swimming Pool Disinfection With Chlorinated–S–Triazine Trione Products," Monsanto Industrial Chemicals Company Special Report No. 6862, revised May, 1975, Fig. 49, Effect of Cyanuric Acid, pH and Glycoluril on the Stability of Hypochlorite Exposed to Sunlight.

○ ACL 90 GRANULES
⊛ NaBr GRANULES

HYPOCHLORITE DONOR/BROMIDE ION DONOR TABLETS WHICH ARE STABLE IN WATER

This application is a continuation of application Ser. No. 07/750,577, filed Aug. 28, 1991, now abandoned; which is a continuation-in-part of application Ser. No. 07/750,744, filed Aug. 21, 1991, now abandoned; which is a continuation of Ser. No. 07/366,936, filed Jun. 16, 1989, now abandoned.

FIELD OF THE INVENTION

This invention relates to hypochlorite donor/bromide ion donor tablets for disinfecting recirculating water systems, and more particularly to tablets comprising chlorinated isocyanurates, sodium bromide, and a stabilizer which regulates the rate at which the chlorinated isocyanurate and the sodium bromide are dissolved or dispersed in flowing water. The tablets according to the invention are stable in water, i.e., the tablets do not disintegrate into fines upon exposure to flowing water, but instead dissolve at relatively uniform and commercially acceptable rates.

Tablets prepared according to the invention provide hypobromous acid, which functions as a bromine biocide or disinfectant in recirculating water systems such as cooling towers, swimming pools, spas, etc.

BACKGROUND OF THE INVENTION

A number of different compositions and methods that provide hypobromous acid for disinfecting recirculating water systems have been proposed.

British Pat. No. 1,196,870 discloses dry disinfectant mixtures consisting essentially of the sodium salt of dichloroisocyanuric acid, trichloroisocyanuric acid, or a mixture thereof with an alkali metal bromide and a buffering mixture of sodium carbonate/bicarbonate and optionally including phosphates, polyphosphates, and surface active agents.

U.S. Pat. No. 4,557,926, issued to Nelson et. al, discloses a tablet for disinfecting toilets comprising an alkali metal salt of dichlorocyanuric acid and either sodium bromide or potassium bromide.

U.S. Pat. No. 5,015,643, issued to Jones et. al, discloses solid disinfecting compositions comprising a mixture of 80%–99% by weight trichloro-s-triazinetrione and 1%–20% by weight potassium bromide.

For recirculating water systems, it is preferable that a disinfectant composition be usable in biocide dispensing devices such as erosion feeders, skimmers, and floaters, in order to slowly release the disinfectant into the water system. The preferred disinfectant composition is a mixture of dry solid components that can be compressed into a tablet for use in these devices. Previous attempts to use disinfectant compositions comprising chlorinated isocyanurates and more than about 2 wt. % sodium bromide have not proved entirely satisfactory because the tablets have frequently failed to maintain their integrity as water is circulated through the dispensing device and instead disintegrated into small pieces or fines. Disintegration of the tablets leads to higher dissolution rates due to much higher exposed surface areas. As a result, the disinfectant is released too rapidly and at unpredictable rates.

As used herein, the term "hypochlorite ion donor" means any compound that will generate hypochlorite species when dissolved in water.

The term "chlorinated isocyanurate" means dichloroisocyanuric acid, trichloroisocyanuric acid, [mono(trichloro)-tetra(monopotassium dichloro)]-penta-s-triazinetrione, and [mono(trichloro)-mono(monopotassium dichloro)]-di-s-triazinetrione, and mixtures thereof.

The term "bromide ion donor" means any compound that will generate bromide ions when dissolved in water.

The term "tablet" includes other solid, compressed forms such as sticks and pucks.

SUMMARY OF THE INVENTION

The present invention relates to hypochlorite donor/bromide ion donor tablets for disinfecting recirculating water systems, and more particularly to tablets comprising chlorinated isocyanurates, sodium bromide, and a stabilizer which regulates the rate at which the chlorinated isocyanurate and the sodium bromide are dissolved or dispersed in flowing water. The tablets according to the invention are stable in water, i.e., the tablets do not disintegrate into fines upon exposure to flowing water, but instead dissolve at relatively uniform and commercially acceptable rates.

In one preferred embodiment of the invention, the tablets are comprised of the following solid particulate materials:

a) chlorinated isocyanurates; and b) sodium bromide; and c) a stabilizer selected from active chlorine stabilizer compounds that are compatible, i.e., unreactive, with chlorinated isocyanurates in the solid state, and capable of binding active halogen (chlorine or bromine in the +1 valence state), and less soluble when fully chlorinated than in the less than fully chlorinated state.

In another embodiment of the invention, the tablets are comprised of the following solid particulate materials:

a) chlorinated isocyanurates; and b) sodium bromide encapsulated with a stabilizer selected from coating agents having a low solubility in aqueous media.

The tablets according to the invention are stable in water, i.e., they do not disintegrate into fines upon exposure to flowing water, but instead dissolve at relatively uniform and commercially acceptable rates.

Preferred tablet compositions are those comprising from about 62 wt. % to about 97 wt. % chlorinated isocyanurate, from about 1 wt. % to about 30 wt. % sodium bromide, and from about 2 wt. % to about 8 wt. % stabilizer wherein the stabilizer is an active chlorine stabilizer compound that is compatible with chlorinated isocyanurates in the solid state, and capable of binding active halogen (chlorine or bromine in the +1 valence state), and less soluble when fully chlorinated than in the less than fully chlorinated state. The preferred chlorinated isocyanurate is trichloro-s-triazinetrione (also called trichloroisocyanuric acid and trichloroisocyanurate, which is produced and sold by Monsanto Co. under the product name ACL 90® PLUS. ACL® is a registered trademark of Monsanto Co.).

The invention permits production of water stable tablets containing up to about 30% by weight sodium bromide.

Other features and advantages of the invention will become apparent from the following detailed description, which is directed, by way of illustration only, to compositions comprising trichloro-s-triazinetrione and sodium bromide. These compositions are merely exemplary of various embodiments of the invention, and should not be viewed as a limitation on any claimed invention.

DETAILED DESCRIPTION OF THE INVENTION

It has now been discovered that the problem with making water stable tablets from mixtures of chlorinated isocyanurates and sodium bromide is the large difference in the solubilities of the two materials. For example, trichloro-s-triazinetrione has a solubility limit of 1.2 grams per 100 milliliters of water at 25° C., whereas about 105 grams of sodium bromide can be dissolved in the same volume of water. Hence, when tablets comprising these compounds are immersed in water, the sodium bromide portion will dissolve much faster than the trichloro-s-triazinetrione portion. As a consequence, when mixtures containing more than about 2 wt. % sodium bromide are used, the tablets are unstable in water. The effect of the solubility differences is explained by reference to FIGS. 1–4.

Figure 1A:
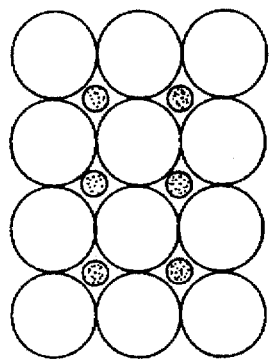
FIG. 1 illustrates trichloro-s-triazinetrione/sodium bromide tablet structures that provide acceptable water stability properties.
Figure 1B:
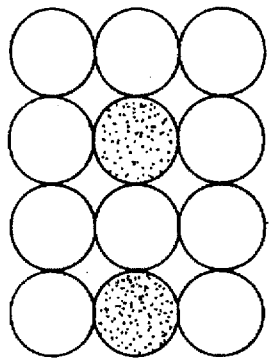

The trichloro-s-triazinetrione/sodium bromide tablet structures illustrated in FIG. 1 exhibit good water stability properties because the highly soluble sodium bromide particles are distributed throughout a continuous matrix of trichloro-s-triazinetrione particles so that the sodium bromide particles are isolated from each other and form a non-continuous matrix. In structure A, the sodium bromide particles are considerably smaller than the trichloro-s-triazinetrione particles and occupy the interstices of the trichloro-s-triazinetrione matrix. In structure B, the sodium bromide and trichloro-s-triazinetrione particles are of similar size and are randomly mixed so that the sodium bromide particles occupy some of the interstices of the trichloro-s-triazinetrione matrix. In both structures A and B, each sodium bromide particle is completely surrounded by trichloro-s-triazinetrione particles so that the sodium bromide cannot form a continuous matrix. Thus, when tablets with these structures are submerged in water, the exposed sodium bromide particles dissolve rapidly, but the integrity of the tablet structure is maintained because the water has to dissolve the less soluble trichloro-s-triazinetrione particles before it dissolves another sodium bromide particle.

Figure 2:
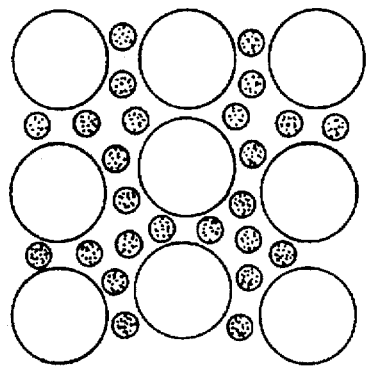
FIGS. 2–4 illustrate trichloro-s-triazinetrione/sodium bromide tablet structures that are not water stable.
Figure 3:
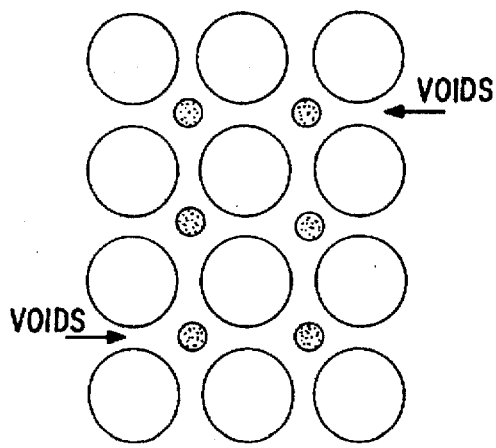
Figure 4:
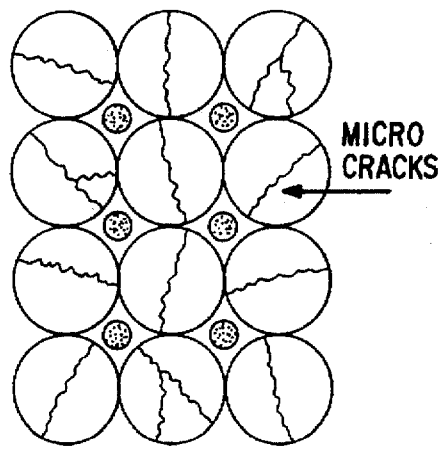

However, if conventional tabletting processes are used on mixtures of trichloro-s-triazinetrione and sodium bromide particles containing more than about 2 wt. % sodium bromide, the result is often tablets having the composite structures illustrated in FIGS. 2–4. These tablets may have a semi-continuous or continuous network of small sodium bromide particles, voids, or microcracks. Such structures allow water to penetrate the tablet and rapidly dissolve the sodium bromide. As a consequence, these tablets have little structural integrity and crack into pieces or disintegrate into fines upon exposure to water.

It has now been found that the water stability of trichloro-s-triazinetrione/sodium bromide tablets is dramatically improved when certain tablet stabilizers belonging to the class of compounds known to be active chlorine stabilizers are included in the tablet composition.

These stabilizers extend the range of water stable trichloro-s-triazinetrione/sodium bromide tablets to mixtures containing up to about 30 wt. % sodium bromide. Tablets containing up to about 30 wt. % sodium bromide are desirable for recirculating water systems contaminated by ammonia.

While not wishing to be bound by theory, it is believed that these advantageous results are obtained because the tablet stabilizers work by the following mechanism, using 5,5-dimethylhydantoin ("DMH") as an example. DMH is quite water soluble, so that it dissolves quickly as water enters the tablet. As the dissolved DMH diffuses toward the surface of the tablet, it is chlorinated by dissolved HOCl that is released by the trichloro-s-triazinetrione. The fully chlorinated DMH, 1,3-dichloro-5,5-dimethylhydantoin, is less soluble in water and precipitates in the pores of the tablet. The precipitate blocks the pores so water cannot wick into the interior of the tablet and sodium bromide cannot dissolve out.

It is contemplated that only a small amount of the tablet stabilizer is needed, just enough to block the pores of the tablet. It is also contemplated that only those active chlorine stabilizers for which the fully chlorinated molecule is considerably less soluble than the non-chlorinated or partially chlorinated derivative will be effective in improving tablet water stability. Finally, the mechanism contemplates that the fully chlorinated and/or brominated analogs of the additives will be ineffective in improving the water stability of trichloro-s-triazinetrione/sodium bromide tablets.

To be effective, the stabilizer must meet the following criteria:

1) the stabilizer must be compatible, i.e., unreactive, with chlorinated isocyanurates in the solid state; and 2) the stabilizer must be capable of binding active halogen (chlorine or bromine in the +1 valence state); and 3) the stabilizer must be less soluble when fully chlorinated than when less than fully chlorinated.

Figure 5:
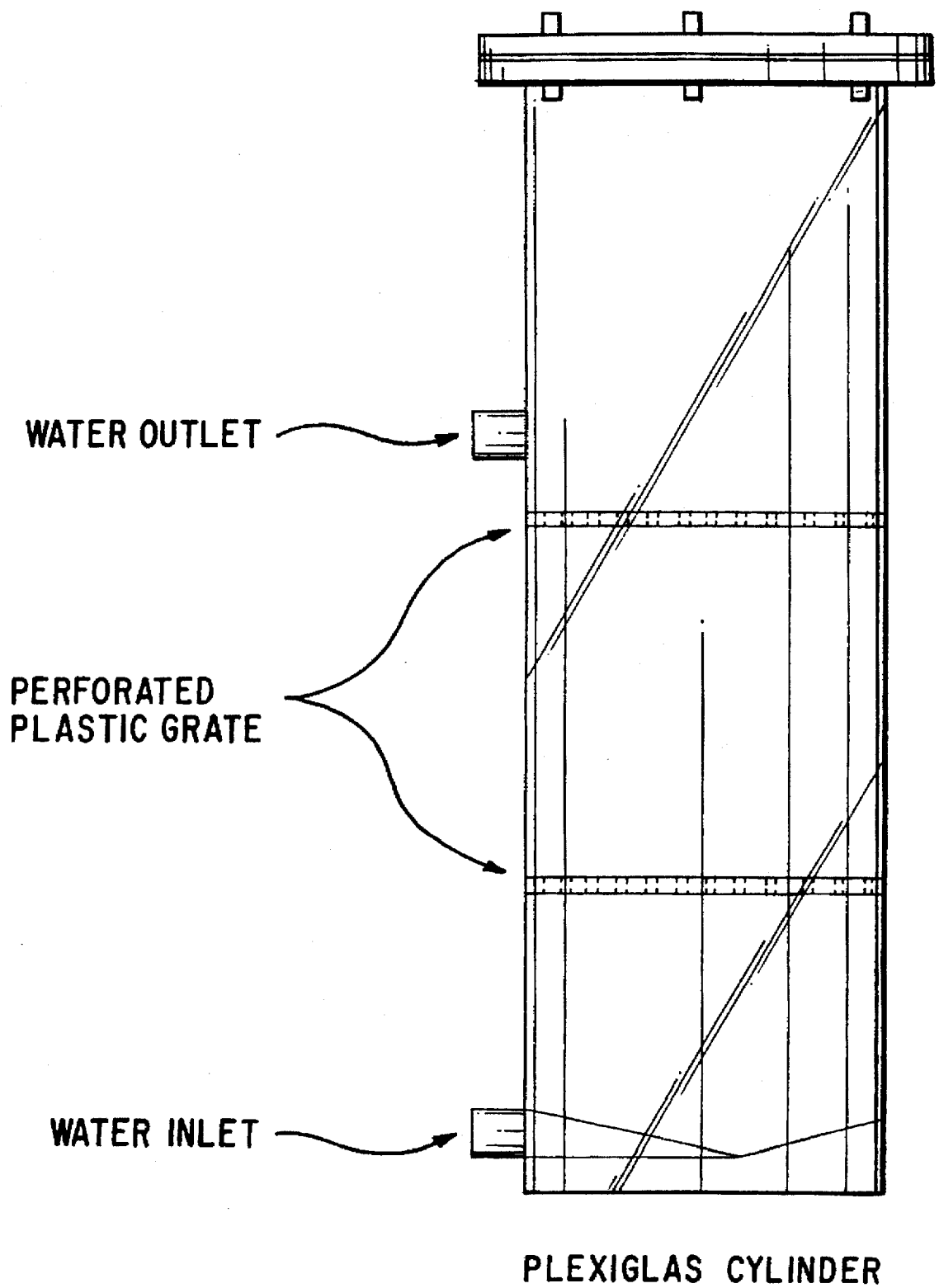
FIG. 5 illustrates an erosion feeder apparatus.

The water stability tests described in the following TABLES 2–5 were conducted using a transparent (plexiglass) erosion feeder measuring 6"wide by 18"tall. The erosion feeder is illustrated in FIG. 5.

The water flow for all of the tests reported was standardized at 1.0 gal/min and the water temperature was 80° F., since the extent of tablet cracking was dependent on both water flow rate and temperature. After the tablets were placed in the feeder, the water flow was started and the tablets were observed for several hours, up to 48 hours.

The trichloro-s-triazinetrione material used in these tests was Monsanto ACL® 90G and ACL® 90XG, commercial grades of trichloro-s-triazinetrione that differ only in their particle size distributions.

The sodium bromide material used had the particle size distribution described in Table 1.

TABLE 1

| Sieves | Sieve Analyses of NaBr Materials Used to Demonstrate Invention Weight Fraction, % | |
|---|---|---|
| | Product A | Product C |
| +10 | 0.0 | 0.0 |
| −10, +12 | 0.0 | 0.0 |
| −12, +16 | 0.0 | Trace |
| −16, +30 | 16.5 | 19.84 |
| −30, +40 | 43.0 | 52.34 |
| −40, +60 | 38.0 | 85.07 |
| −60 | 2.2 | 14.93 |

Tablets were prepared using standard well-known procedures. In each experiment, the proper amounts of the desired components were weighed out to produce a total of 100 grams. The components were then thoroughly mixed by tumbling in a closed jar. Six 15 gram tablets were made from the mixture using a Carver Model C hydraulic press and a 1.125 inch I.D. stainless steel die. The area of the punch face was 1.00 square inches. The maximum applied tabletting pressure and the dwell time were set using the controls for the hydraulic drive. The dwell time was held at 2 seconds. Tablets were made at the specified tabletting pressures for a given composition.

Tablet water stability was evaluated by visual examination. As the tablets dissolved, they were visually examined for the development of cracks. Tablets were judged to be water stable if the tablets survived for more than eight hours under the standard conditions without cracking through the entire height or width of the tablet, since very minor cracks did not seriously affect the dissolution rate.

The data in TABLE 2 show that the addition of DMH at levels of 2 wt. % makes it possible to increase the NaBr content to 15 wt. % and still obtain water stable tablets. The data also show that the addition of 4 wt. % DMH allows the production of water stable tablets with up to 20 wt. % NaBr. In addition, the data show that the addition of 8 wt. % DMH allows the production of water stable tablets with up to 30 wt. % NaBr.

TABLE 2

Effect of Adding Dimethylhydantoin on the Water Stability of ACL ® 90/NaBr One-Inch Tablets

| Weight Ratio | | | Grade of | Tabletting Pressure |
|---|---|---|---|---|
| ACL ® 90 | NaBr* | DMH | ACL ® 90 | Required (k psi) |
| 85 | 15 | 0 | G | 16 (Tablet Not Stable) |
| 84.5 | 15 | 0.5 | G | 12 Tablet Stable |
| 84 | 15 | 1 | G | 11 Tablet Stable |
| 83 | 15 | 2 | G | 10 Tablet Stable |
| 81 | 15 | 4 | G | 10 Tablet Stable |
| 80 | 20 | 0 | G | >16 (Tablet Not Stable) |
| 79 | 20 | 1 | G | 12 Tablet Stable |
| 78 | 20 | 2 | G | 10 Tablet Stable |
| 76 | 20 | 4 | G | 10 Tablet Stable |
| 85 | 15 | 0 | XG | 14 (Tablet Not Stable) |
| 84.5 | 15 | 0.5 | XG | 12 Tablet Stable |
| 84 | 15 | 1 | XG | 10 Tablet Stable |
| 83 | 15 | 2 | XG | 10 Tablet Stable |
| 81 | 15 | 4 | XG | 12 Tablet Stable |
| 70 | 30 | 0 | G | 12 Tablet Not Stable) |
| 62 | 30 | 8 | G | 12 Tablet Stable |

*NaBr Product A

The data in TABLE 3 show that glycoluril can be blended with ACL® 90/NaBr mixtures to produce water stable tablets with NaBr contents up to 30 wt. %.

TABLE 3

Effect of Adding Glycoluril on the Water Stability of ACL ® 90/NaBr One-Inch Tablets

| Weight Ratio | | | Grade of | Tabletting Pressure |
|---|---|---|---|---|
| ACL ® 90 | NaBr | Gly. | ACL ® 90 | Required (k psi) |
| 85 | 15 | 0 | G | 16 (Tablet Not Stable) |
| 81 | 15 | 4 | G | 6 Tablet Stable |
| 80 | 20 | 0 | G | >16 (Tablet Not Stable) |
| 76 | 20 | 4 | G | 8 Tablet Stable |
| 70 | 30 | 0 | G | 12 (Tablet Not Stable) |
| 62 | 30 | 8 | G | 12 Tablet Stable |

The data in TABLE 4 show that cyanuric acid does not improve the water stability of ACL® 90/NaBr tablets even though it is known to be a chlorine stabilizing agent. As shown in TABLE 5, cyanuric acid is less soluble than either dichloro- or trichloro-isocyanuric acid. Thus, cyanuric acid does not meet the criteria for effective tablet stabilizers.

TABLE 4

Effect of Other Additives on the Water Stability of ACL ® 90/NaBr One-Inch Tablets

| Weight Ratio | | | Grade of | Tabletting Pressure |
|---|---|---|---|---|
| ACL ® 90 Add. | NaBr | Additive | ACL ® 90 | Required (k psi) |
| 85 | 15 | 0 — | G | 16 Tablet Not Stable |
| 81 | 15 | 4 Cyanuric Acid | G | 14 Tablet Not Stable |
| 81 | 15 | 4 Phthalimide | G | 16 Tablet Not Stable |
| 81 | 15 | 4 Toluenesul-fonimide | G | >16 Tablet Not Stable |
| 81 | 15 | 4 Glutarimide | G | 8 Tablet Stable |
| 62 | 30 | 8 Glutarimide | G | 12 Tablet Stable |

TABLE 5

Solubilities of Some Additives and Their Chlorinated Derivatives

| Compound | Temperature (°C.) | Solubility in Water (gm/100 gm Water) |
|---|---|---|
| Cyanuric acid | 25 | 0.2 |
| Dichloroisocyanuric acid | 25 | 0.8 |
| Trichloroisocyanuric acid | 25 | 1.2 |
| Dimethylhydantoin | 20 | 13.5 |
| Chloro-dimethylhydantoin | 25 | 0.87 |
| Dichloro-dimethylhydantoin | 25 | 0.16 |
| Glycoluril | 17 | 0.1 |
| Dichloroglycoluril | 20 | 0.47 |
| Tetrachloroglycoluril | 25 | 0.008 |
| p-Toluenesulfonamide | 25 | 0.32 |
| N-Chloro-toluenesulfonamide | — | — |
| N,N-Dichloro-toluenesulfonamide | — | — |
| Phthalimide | 25 | 0.06 |
| N-Chlorophthalimide | — | — |

The data in TABLE 4 further show that phtalimide and toluenesulfonimide are not effective in improving the water stability of ACL® 90/NaBr tablets, but that glutarimide is at least as effective as DMH as a water stability additive.

In another embodiment of the invention, it is contemplated that water stable trichloro-s-triazinetrione/sodium bromide tablets containing greater than about 15 wt. % sodium bromide may be obtained by encapsulating the sodium bromide particles with a low-solubility coating.

In addition to the tablet components described above, the tablet compositions may optionally contain other ingredients such as fillers, binders, scale inhibitors, corrosion inhibitors, and other components known to one skilled in the art.

Use of higher tabletting pressures allows harder, denser tablets to be made. At high tabletting pressures, use of a mold release agent or lubricant reduces damage to the tablet upon ejection from the tabletting die. Any material commonly used to lubricate dies and aid in the tabletting of ACL® 90 may be used, but preferred lubricants are any of the stearate lubricants. However, mixing the stearate lubricant into the bulk of the tablet is not preferred since this may adversely affect the water stability by interfering with the binding between ACL® 90 particles. Instead, the stearate is preferably applied using a puffer system, which applies the lubricant directly onto the walls of the punches and die. In this way, only the external surface of the tablet is lubricated and the tablet contains a negligible amount of stearate.

Moisture also adversely affects the water stability of tablets. Moisture causes a reaction to occur between the ACL® 90 and sodium bromide particles. This reaction results in the formation of bromine gas, a noxious, pungent smelling, reddish-brown gas. This gas is a health hazard to personnel operating the blending and tabletting units. In addition, it leads to severe corrosion of the equipment. Therefore, it is preferable to use a sodium bromide material with a moisture content below 0.4 wt. % and more preferably below 0.2 wt. %. Use of a dry air purge is also important to insure that the moisture level does not exceed these limits during handling, due to the hydroscopic nature of the sodium bromide.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A water stable tablet for disinfecting recirculating water systems that provides prolonged and controlled release of hypobromous acid when immersed in water comprising the following solid particulate materials:
   a) chlorinated isocyanurates; and
   b) sodium bromide having a moisture content less than about 0.4 wt. %; and
   c) a stabilizer selected from active chlorine stabilizer compounds that are compatible with chlorinated isocyanurates in the solid state, and capable of binding active halogen (chlorine or bromine in the +1 valence state), and less soluble when fully chlorinated than in the less than fully chlorinated state.

2. The tablet of claim 1 wherein the chlorinated isocyanurate is dichloroisocyanuric acid, trichloro-s-triazinetrione, [mono(trichloro)-tetra(monopotassium dichloro)]-penta-s-triazinetrione, [mono(trichloro)-mono(monopotassium dichloro)]-di-s-triazinetrione, or mixtures thereof.

3. The tablet of claim 1 wherein the active chlorine stabilizer compound is 5,5-dimethylhydantoin, glycoluril, or glutarimide.

4. The tablet of claim 1 comprising from about 62 wt. % to about 97 wt. % chlorinated isocyanurate, from about 1 wt. % to about 30 wt. % sodium bromide, and from about 2 wt. % to about 8 wt. % active chlorine stabilizer compound.

5. The tablet of claim 4 comprising trichloro-s-triazinetrione, sodium bromide, and 5,5-dimethylhydantoin.

6. A water stable tablet for disinfecting recirculating water systems that provides prolonged and controlled release of hypobromous acid when immersed in water comprising the following solid particulate materials:
   a) chlorinated isocyanurates; and
   b) sodium bromide, wherein the particles have been encapsulated with a coating agent having a low solubility in aqueous media.

7. A water stable tablet for disinfecting recirculating water systems that provides prolonged and controlled release of hypobromous acid when immersed in water comprising the following solid particulate materials:
   a) chlorinated isocyanurates; and
   b) sodium bromide having a moisture content less than about 0.4 wt. %; and
   c) a stabilizer selected from active chlorine stabilizer compounds that are compatible with chlorinated isocyanurates in the solid state, and capable of binding active halogen (chlorine or bromine in the +1 valence state), and less soluble when fully chlorinated than in the less than fully chlorinated state;
wherein said stabilizer is chlorinated by hypochlorous acid released by said chlorinated isocyanurates when said tablet is immersed in water and precipitates in the pores of said tablet so as to at least partially block the pores and thereby slow the dissolution of said sodium bromide from said tablet.

8. A water stable tablet for disinfecting recirculating water systems that does not crack through the entire height or width of said tablet for at least eight hours and that provides prolonged and controlled release of hypobromous acid when immersed in water comprising the following solid particulate materials:
   a) chlorinated isocyanurates; and
   b) sodium bromide having a moisture content less than about 0.4 wt. %; and
   c) a stabilizer selected from active chlorine stabilizer compounds that are compatible with chlorinated isocyanurates in the solid state, and capable of binding active halogen (chlorine or bromine in the +1 valence state), and less soluble when fully chlorinated than in the less than fully chlorinated state.

9. The tablet of claim 7 or 8 wherein the chlorinated isocyanurate is dichloroisocyanuric acid, trichloro-s-triazinetrione, [mono(trichloro)-tetra(mono(potassium dichloro)]-penta-s-triazinetrione, [mono(trichloro)-mono(monopotassium dichloro)]-di-s-triazinetrione, or mixtures thereof.

10. The tablet of claim 7 or 8 wherein the active chlorine stabilizer compound is 5,5-dimethylhydantoin, glycoluril, or glutarimide.

11. The tablet of claim 1, 7 or 8 comprising from about 62 wt. % to about 98 wt. % chlorinated isocyanurate, from about 1 wt. % to about 30 wt. % sodium bromide, and from about 1 wt. % to about 8 wt. % active chlorine stabilizer compound.

12. The tablet of claim 1, 7 or 8 comprising from about 62 wt. % to about 84 wt. % chlorinated isocyanurate, from about 15 wt. % to about 30 wt/% sodium bromide, and from about 1 wt. % to about 8 wt. % active chlorine stabilizer compound.

13. The tablet of claim 12 comprising trichloro-s-triazinetrione, sodium bromide, and 5,5-dimethylhydantoin.

14. The tablet of claim 7 wherein the tablet does not crack through the entire height or width of said tablet for at least eight hours when immersed in water.

15. The tablet of claim 1, 7 or 8 comprising from about 76 wt. % to about 84.5 wt. % chlorinated isocyanurate, from about 15 wt. % to about 20 wt. % sodium bromide, and from about 0.5 wt. % to about 4 wt. % active chlorine stabilizer compound.

* * * * *